May 4, 1943.  M. I. ALIMANSKY  2,317,970
CAPACITOR CONSTRUCTION AND CIRCUIT ARRANGEMENT
FOR POLYPHASE CIRCUITS
Filed Feb. 13, 1940
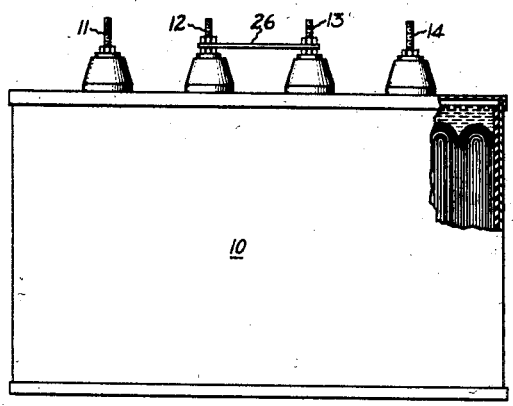
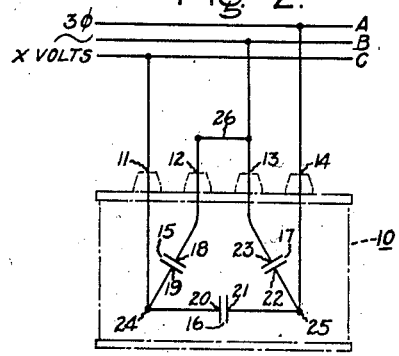
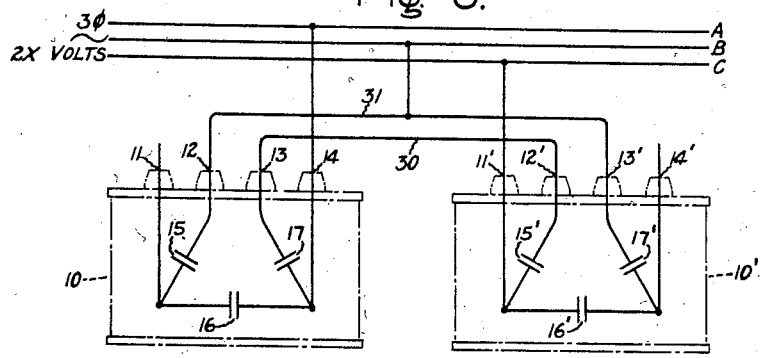
Inventor:
Max I. Alimansky,
by Harry E. Dunham
His Attorney.

Patented May 4, 1943

2,317,970

UNITED STATES PATENT OFFICE 2,317,970

CAPACITOR CONSTRUCTION AND CIRCUIT ARRANGEMENT FOR POLYPHASE CIRCUITS

Max I. Alimansky, Pittsfield, Mass., assignor to General Electric Company, a corporation of New York Application February 13, 1940, Serial No. 318,723

9 Claims. (Cl. 172—238)

The present invention relates to application of capacitors to polyphase alternating current circuits for power factor improvement or other purposes, and has for a general object the provision of improvements in construction and circuit connections for capacitors so applied.

One of the more specific objects of the invention is the provision of an improved 3-phase capacitor unit which may be employed singly on a polyphase circuit operating at a voltage corresponding substantially to the voltage rating of the capacitor unit, and which unit is adapted for employment also with other capacitor units of similar construction on polyphase circuits operating at voltages which are multiples of the voltage rating of the single capacitor unit.

Another of the specific objects of the invention is the provision of simple and readily convertible connection arrangements for connection of capacitor units, such as referred to above, in polyphase circuits of different voltages.

Other objects and the details of that which I consider to be novel and my present invention will become apparent from the following description and the claims appended thereto, taken in conjunction with the accompanying drawing wherein is illustrated an exemplary embodiment of the invention.

In the drawing, Fig. 1 is a side elevation of an exemplary form of capacitor unit employed with the present invention, Fig. 2 illustrates diagrammatically the internal connections of the capacitor unit of Fig. 1 and the manner of connecting such unit in an electric circuit in accordance with one aspect of the invention, and Fig. 3 illustrates diagrammatically the manner of connecting two such units in an electric circuit in accordance with another aspect of the invention. It is to be understood that all references made herein to specific k. v. a. ratings and voltages are for purposes of example only, since the present invention is not limited to any particular k. v. a. rating or voltage.

It sometimes occurs that it is desired to apply capacitors to an electric system operating at a certain voltage, with provision for employment of the same capacitor units in case the electric system later is converted to higher voltage service. In some cases, particularly where it is desired to apply capacitance in blocks of small k. v. a., this may present difficulties due to the fact that capacitor units commonly are manufactured and supplied only in certain standard ratings. For example, it may be desired to apply capacitors in blocks of small k. v. a. to a plant feeder system which is operating at 230 volts, but which is to be converted to 460 volts, and at the same time it may be found that it is most desirable for economical or other reasons to utilize standard capacitor units of 230 volt, 5 k. v. a. rating. Usually capacitor units are made available in the standard ratings for operation single-phase, 2-phase, or 3-phase. In the example mentioned, a heretofore common form of capacitor unit, of a standard 230 volt, 5 k. v. a. rating and internally delta-connected for 3-phase operation, might be employed initially to give the desired small k. v. a. at any one point of capacitor application on the 230 volt, 3-phase system. However, such a capacitor unit would not be suitable for employment, as by connection in series with another similar capacitor unit, when the system is converted to 460 volts. A standard 5 k. v. a., 3-phase capacitor unit of 460 volt rating might be employed initially with some form of voltage conversion apparatus, but this would require additional equipment which would be discarded when the 230 volt system is converted to 460 volts. Another alternative would be the employment of three standard 230 volt, 5 k. v. a., single-phase capacitor units, each connected across a respective one of the phases of the 230 volt circuit. Then upon conversion to 460 volt service, the original three capacitor units could be used with the addition of three similar units, with two of the units connected in series across each one of the phases of the 460 volt circuit. However, in this last case, the three single-phase units originally employed for 230 volt service would provide a block of 15 k. v. a., while the six units employed for 460 volt service would provide a block of 30 k. v. a., which might be too high in view of a desire to limit the application of capacitors to small k. v. a. blocks.

In order to overcome in a simple and economical manner the difficulties above referred to, I have provided an improved form of 3-phase capacitor unit and improved circuit connection arrangements therefor, now to be described.

An exemplary form of capacitor unit employed with the present invention is shown in side elevation in Fig. 1 and generally designated 10. In fundamental construction, this unit may be of a form well known in the capacitor art, such as, for example, comprised of layers of metal foil and dielectric spacing material wound into a number of rolls which are flattened and arranged in side-by-side relationship in suitable enclosing casing containing a liquid insulation material, such as that known as pyranol, or other suitable filling medium. For the purposes of the present invention, the casing of the capacitor unit is provided with four bushing supported terminal studs designated 11, 12, 13, and 14 respectively, and the foils of the internal assembly of the unit are electrically grouped in any well known manner so as to provide three sections 15, 16 and 17 of equal capacity, as diagrammatically indicated in Fig. 2. It will be understood of course that each of these sections may comprise one or more rolls of the internal assembly. For purposes of description the opposite potential poles of section 15 are designated as 18 and 19, the poles of section 16 as 20 and 21 and the poles of section 17 as 22 and 23. Pole 19 of section 15 is electrically connected with pole 20 of section 16 at a common point designated 24 which is electrically connected with terminal stud 11. The other pole, 21, of section 16 is electrically connected with one of the poles, 22, of section 17 at a common point 25 which is electrically connected with terminal stud 14. The remaining pole, 18, of section 15 is electrically connected with terminal stud 12, while the remaining pole, 23, of section 17 is electrically connected with terminal stud 13. Thus there is produced in effect a delta-connected circuit arrangement with one of the corners of the delta left open and brought out for the making of connections externally of the casing of the capacitor unit. This capacitor structure is described and claimed in my copending application S. N. 406,367, filed August 11, 1941, and assigned to the same assignee as the present invention.

In Fig. 2 there is diagrammatically illustrated a connection arrangement for application of a capacitor unit, as described above, to a 3-phase alternating current circuit having phase conductors A, B, and C and a voltage $x$ between the phase conductors approximately equal to the voltage rating of the capacitor unit. In this case, a suitable form of conductive jumper, indicated at 26, is removably connected between terminal studs 12 and 13 so as externally to complete the delta circuit arrangement of the capacitor sections 15, 16 and 17. Terminal studs 11, 13, and 14 are shown diagrammatically as being connected with phase conductors C, B, and A, respectively. Thus, section 15 is connected across phase B—C, section 16 is connected across phase A—C, and section 17 is connected across phase A—B.

Now, if it is desired to employ a capacitor unit, such as that designated 10, on a 3-phase circuit operating at a voltage substantially double the voltage rating of the capacitor unit, this may be accomplished in the manner diagrammatically shown in Fig. 3, by reason of the terminals of the open corner of the delta of the internal capacitor assembly being brought out for connection purposes. In such case, the jumper 26 between terminals 12 and 13 is left off, and a second capacitor unit 10', identical with unit 10, is added. In applying the two capacitor units to a 3-phase circuit operating at a voltage $2x$, approximately double the voltage rating of either one of the units taken singly, terminal 13 of unit 10 is connected by means of a jumper 30 with terminal 12' of unit 10', and terminal 12 of unit 10 is connected with terminal 13' of unit 10' by means of a jumper 31. Then terminal 14 of unit 10 is connected with phase conductor A, jumper 31 is connected with phase conductor B, and terminal 11' of unit 10' is connected with phase conductor C. Thus, sections 15 and 16 of unit 10 are connected in series with each other and across phase A—B, and sections 16' and 17' of unit 10' are connected in series with each other across phase B—C, while the remaining section 17 of unit 10 is connected in series with the remaining section 15' of unit 10' across phase A—C. This completes a delta-circuit arrangement leaving two of the capacitance sections in series in each side or phase of the delta.

From the foregoing, it will be seen that by reason of the present invention, it is made possible to employ a single capacitor unit of small k. v. a. rating in the application of capacitance to a 3-phase circuit operating at a voltage substantially the same as the voltage rating of the capacitor unit, and to employ the same capacitor unit in conjunction with only one other capacitor unit of similar construction in the application of capacitance to a 3-phase circuit operating at a voltage approximately double the voltage rating of one of the units. For example, a single capacitor constructed in accordance with the present invention and having a rating of 230 volts, 5 k. v. a., may be applied to a 3-phase circuit operating at approximately 230 volts, in the manner shown in Fig. 2, while two of such capacitor units, each having a rating of 230 volts, 5 k. v. a., may be connected in series in the manner shown in Fig. 3 for application to a 3-phase circuit operating at approximately 460 volts. However, it is to be understood that the present invention is not limited necessarily to application of capacitance in small k. v. a. blocks. As will be evident to one skilled in the art, several capacitor units, such as the one designated 10, may be connected in parallel for application to a 3-phase circuit in a manner similar to that shown in Fig. 2, if large blocks of capacitance are desired. Likewise, for the circuit arrangement illustrated in Fig. 3, there may be employed either two identical units, as illustrated, or multiples of two, if larger blocks of capacitance are desired. Also, the units themselves may be made in larger voltage and k. v. a. ratings than the examples heretofore mentioned.

A further advantage of my invention is that capacitor units for use in the practice of the invention require no special expensive design and may be made to have very nearly the same fundamental construction as standard forms of three-phase capacitor units heretofore common in the art. Thus, standard parts may be used practically exclusively and already established assembly machines and routines may be availed of, so that simplicity and economy of manufacture is obtained.

What I claim as new and desire to secure by Letters Patent of the United States is:

1. In combination with a three-phase alternating current circuit, a capacitor unit having three electric capacitance sections and four terminals for connection of said sections in said circuit; one of said terminals being common to one pole of one of said sections and one pole of a second of said sections, a second of said terminals being common to the other pole of said second section and one pole of the third of said sections, the remaining two of said terminals being connected respectively with the remaining pole of said one section and with the remaining pole of said third section; and means, employing at least three of said terminals, connecting all of said sections for supplying capacitance to said three-phase circuit.

2. In combination with a three-phase alternating current circuit, a capacitor unit having three electric capacitance sections and four connection terminals therefor; one of said sections being connected between one pair of said terminals, a second of said sections being connected between the other pair of said terminals, the third of said sections being connected between one terminal of said one pair and one terminal of said other pair; and means, employing at least three of said terminals, connecting all of said sections in a delta-circuit arrangement for supplying capacitance to said three-phase circuit.

3. In combination with a three-phase alternating current circuit, a capacitor unit having three electric capacitance sections and four connection terminals therefor; one pole of one of said sections and one pole of a second of said sections being interconnected and having one of said terminals in common, the other pole of said second section and one pole of the third of said sections being interconnected and having a second of said terminals in common, the third and fourth of said terminals being connected respectively with the remaining pole of said one section and with the remaining pole of said third section; means connecting said one terminal and said second terminal each with a respective one of the phase conductors of said circuit, and means connecting both said third terminal and said fourth terminal with a third one of the phase conductors of the circuit.

4. In combination with a three-phase alternating current circuit, a plurality of capacitor units; each of which units has three electric capacitance sections and four connection terminals therefor, with one of the terminals common to a pole of one of the sections and a pole of a second of the sections, another of the terminals common to the other pole of said second section and a pole of the third of the sections, and the remaining two of the terminals connected respectively with the remaining pole of said one section and with the remaining pole of said third section; and means interconnecting certain of the terminals of two of said units and connecting the conductors of said three-phase circuit with certain of the terminals of said two units in a manner to complete connection of the six sections of said two units in a delta-circuit arrangement with a respective two of the six sections in series across each of the phases of the circuit.

5. In combination with a three-phase alternating current circuit, a plurality of capacitor units each having three electric capacitance sections, means connecting the six sections of two of said units in a delta-circuit arrangement having a respective two of said six sections in series in each side of the delta, and means for supplying the capacitance of each side of the delta to a respective one of the phases of said three-phase circuit.

6. In combination with a three-phase alternating current circuit, two similar capacitor units each having three electric capacitance sections and connection terminals therefor, and means connecting a respective two of the sections of said units in series across each of the phases of said three-phase circuit.

7. In combination with a three-phase alternating current circuit, a plurality of capacitor units each having three electric capacitance sections and connection terminals therefor, and connection means for supplying the capacitance of two serially connected sections of one of said units to one of the phases of said circuit, the capacitance of two serially connected sections of another of said units to another phase of said circuit, and the capacitance of the serially connected remaining sections of said one unit and said other unit to the third phase of said circuit.

8. In a capacitor assembly for supplying capacitance to a three-phase circuit, two similar capacitor units each of which has three electric capacitance sections and connection terminals therefor, and means interconnecting certain of the terminals of one of said units with certain of the terminals of the other of said units in a manner to complete connection of the six sections of said two units in a delta-circuit arrangement with a respective two of the sections in series in each side of the delta.

9. In a capacitor assembly for supplying capacitance to a three-phase circuit, two similar capacitor units; each of said units having three electric capacitance sections and four connection terminals therefor with one of the terminals common to a pole of one of said sections and a pole of a second of said sections, another of the terminals common to the other pole of said second section and a pole of the third of said sections, and the two remaining terminals of the unit connected respectively with the remaining pole of said one section and the remaining pole of said third section; and means electrically interconnecting each of the said two remaining terminals of one of said units with a respective one of the said two remaining terminals of the other of said units.

MAX I. ALIMANSKY.